United States Patent

[11] 3,614,600

| [72] | Inventor | Vaino Ronka<br>Don Mills, Ontario, Canada |
|---|---|---|
| [21] | Appl. No. | 846,424 |
| [22] | Filed | July 31, 1969 |
| [45] | Patented | Oct. 19, 1971 |
| [73] | Assignee | Geonics Limited<br>Toronto, Ontario, Canada<br>Continuation-in-part of application Ser. No. 632,656, Apr. 21, 1967, now Patent No. 3,500,715. |

[54] ELECTROMAGNETIC PROSPECTING APPARATUS FOR DETECTING ELECTRICALLY OR MAGNETICALLY RESPONSIVE ORE BODIES
14 Claims, 5 Drawing Figs.

[52] U.S. Cl. ................................................. 324/4, 324/6
[51] Int. Cl. ................................................. G01v 3/12, G01v 3/16
[50] Field of Search ........................................ 324/4, 6, 3, 7

[56] References Cited
UNITED STATES PATENTS

| 2,471,105 | 5/1949 | Gustafsson et al. | 324/6 |
| 2,887,650 | 5/1959 | Ruddock et al. | 324/6 |
| 2,929,984 | 3/1960 | Puranen et al. | 324/6 |
| 2,931,973 | 4/1960 | Puranen | 324/6 |
| 2,995,699 | 8/1961 | Snelling et al. | 324/6 X |
| 3,214,686 | 10/1965 | Elliot et al. | 324/6 |
| 3,500,175 | 3/1970 | Ronka | 324/3 |

*Primary Examiner*—Gerard R. Strecker
*Attorney*—Curtis, Morris & Safford

ABSTRACT: Electromagnetic prospecting apparatus which may be used in an airplane for detecting electrically conductive buried ore bodies when they are intersected by a horizontal primary electromagnetic field. The prospecting apparatus includes a receiving, or pickup, coil and a reference coil, preferably orthogonal to the receiving coil, and apparatus for detecting real and quadrature components of voltages which are induced in the pickup coil due to the presence of vertical secondary field components which emanate from the buried ore bodies when they are intersected by the horizontal primary field. The detection is accomplished independent of the strength of the primary field or its frequency and is particularly adapted for prospecting with interrupted or frequency shifted types of primary fields.

PATENTED OCT 19 1971 3,614,600

INVENTOR.
VAINO RONKA

BY
Curtis, Morris & Safford
ATTORNEYS

ELECTROMAGNETIC PROSPECTING APPARATUS FOR DETECTING ELECTRICALLY OR MAGNETICALLY RESPONSIVE ORE BODIES

This invention relates to an electromagnetic prospecting apparatus for detecting electrically conductive buried ore bodies and, more particularly, relates to apparatus which is advantageously adapted for airborne use. It is a continuation in part of my copending application Ser. No. 632,656 Pat. No. 3,500,715.

It is usual in electromagnetic prospecting to establish a primary alternating magnetic field in the earth and to measure real and quadrature components of secondary magnetic fields emanating from electrically conductive ore bodies, such as massive sulfides, when they are intersected by the primary field. The real components are in-phase or 180° out-of-phase with the primary field and the quadrature components are 90° out-of-phase with the primary field. THe real and quadrature components are indicative of the character and quality of the buried ore bodies.

Conventional electromagnetic prospecting systems usually employ a local electromagnetic transmitter for producing the primary field and a sensitive receiver for detecting the secondary fields. The transmitter presents problems of weight and power consumption. In addition, careful precautions are necessary to separate the components of the secondary fields from the primary field. Another kind of prospecting system, called the AF-MAG system, measures the tilt of the plane of polarization of naturally occuring electromagnetic fields. The source of these fields appears to be associated with thunderstorms. The AF-MAG system is said to offer greater depth of penetration than conventional electromagnetic systems because the source is theoretically at infinity, then offering a uniform primary field, but a serious disadvantage is that the AF-MAG system relies on natural electromagnetic fields which vary daily as well as seasonally. As a result, there are daily and seasonal periods when it is not practical to conduct a survey.

The apparatus of the present invention utilizes distant very low frequency (VLF) signals, preferably from radio stations, as sources of primary fields. The antennas of such stations are generally vertical, and the flow of antenna current produces a horizontal magnetic field which deeply penetrates the earth and which can be detected at substantial distances from the radio station. Relatively deep ore bodies can be detected with the apparatus, and, as no local transmitter is required, there is a considerable saving in weight and power.

Although this invention preferably utilizes a distant VLF signal from a radio transmitter, the naturally occurring electromagnetic fields described above can be used, if desired, as a primary field source. In this regard, the apparatus of the present invention can be used for detecting both real and quadrature components of the secondary fields resulting when a buried ore body is intersected by such a naturally occuring field, whereas previously only the real component of the secondary field, or the tilt angle of the total field, could be measured.

Since the apparatus of the present invention utilizes fields of a selected specific frequency, whether naturally occurring or from a distant transmitter, it is important that it be immune to atmospheric noise during its period of operation. Also, there should be little or no frequency sensitivity within the practical band width of its operation.

Accordingly, an object of the present invention is to provide efficient, sensitive electromagnetic prospecting apparatus that is as immune as possible to most atmospheric noise during periods of operation and that is not frequency sensitive within its practical bandwidth of operation.

Another object of this invention is to provide equipment which more effectively utilizes fields from distant radio transmitters and/or naturally occuring electromagnetic fields for electromagnetic prospecting.

In a preferred form of the invention, the above objects are achieved by the provision of electromagnetic prospecting apparatus which includes a receiving, or pickup, coil and a reference coil, preferably orthogonal to the receiving coil, and apparatus for detecting the signals picked up by the receiving coil. The receiving, or pickup, coil has voltages induced therein due to the presence of real and quadrature components of secondary alternating magnetic fields that emanate from buried ore bodies when they are intersected by a primary VLF alternating magnetic field which may be either naturally occuring or from a distant transmitter. The reference coil is used to derive both a real and a quadrature reference voltage and both a real and quadrature compensating voltage. Each respective reference voltage is mixed in a separate channel with the voltage picked up by the receiving coil. Then, each mixed voltage is amplitude limited and fed to a phase discriminating synchronous detector whose respective DC voltage output is indicative of either the real or the quadrature components of the secondary alternating magnetic fields. The DC output from the synchronous detectors advantageously does not depend upon the signal strength of the primary field. Further, in the embodiments disclosed servo-loops are provided to enable continuous recording of the discontinuous signal which is detected.

Other objects and advantages of the present invention will be made apparent from the preferred embodiments of the invention which are illustrated in the accompanying drawing, wherein.

The principles upon which the art of electromagnetic prospecting is based are well understood. For background information, please refer to U.S. Pat. No. 3,042,857 to Vaino Ronka and U.S. Pat. No. 2,623,924 to W. O. Cartier et al. It is sufficient to state that measurements indicative of real and quadrature components of secondary fields assist in locating buried ore bodies and in estimating their worth. In practice, it is often sufficient to measure the real and quadrature components of only the vertical components of the secondary fields and the apparatus disclosed herein is particularly adapted to do this.

Figure 1:
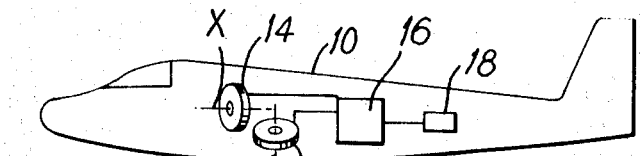
FIG. 1 is a pictorial view showing a preferred form of the invention in an airplane passing over a sectional view of the earth, which view also shows, somewhat diagrammatically, a portion of a secondary magnetic field surrounding a buried ore body.

Referring now to FIG. 1, an aircraft 10 carrying a receiving, or pickup, coil 12, a reference coil 14 and apparatus 16, having a recording device 18, is shown. The apparatus carried by the aircraft 10 is for detecting and recording values of secondary field components which are induced in the receiving coil 12 as aircraft 10 flies over an electrically conductive buried ore body 20, which body is surrounded by rock 22 and covered with overburden 24, Arrows $H_p$ represent a horizontal primary field and arrows $H_s$ represent a secondary field emanating from the ore body 20. The arrow $H_t$ represents the total field at the point $a$.

The primary field $H_p$ may be naturally occuring or may be provided by a distant electromagnetic transmitter operating in the VLF (very low frequency) band, i.e., in the band between about 10–30 kHz. The U.S. Navy, for example, operates a number of powerful radio stations in the U.S. for communication with submarines which stations can be used as sources of primary fields. These stations use vertical antennas. The direction of the antenna current therefore is vertical, and the flow of antenna current produces a horizontal alternating magnetic field which penetrates deeply into the earth. Over nonconductive earth the total magnetic field $H_T$ (identical to $H_p$ in this case) is horizontal, but in the vicinity of conductors magnetic field $H_t$ shifts from its horizontal direction, (see the vector diagram in FIG. 1) because of the secondary fields that are present.

In the presence of an ore body, the total field, accordingly, comprises both vertical and horizontal components. The horizontal components consist primarily of the horizontal primary field $H_p$, but also of small horizontal components of the secondary fields $H_s$. The primary field does not have vertical components and, accordingly, the vertical components of the total field, $H_T$ consist only of the vertical components from the secondary field $H_s$.

Reference coil 14, which may take any suitable shape, such as circular, square or rectangular, and which has electrostatic shields and a magnetic core, has its axis $x$ aligned in the direction of the primary field and, hence, has a voltage induced therein due to the presence of the horizontal primary field $H_p$ and the horizontal components of the secondary field $H_s$. The receiving or pickup, coil 12, similar to coil 14, has its axis $y$ aligned at right angles to the axis $x$ of coil 14, and, hence, will have a voltage induced therein due to the presence of the vertical components of the total field, i.e., due to the presence of the vertical components from the secondary fields $H_s$, which emanate from the ore body 20.

Accordingly, as airplane 10 flies over the overburden 24, the coil 14 has a voltage induced therein due to the presence of the horizontal primary field $H_p$. Coil 12, having its axis $y$ aligned perpendicular to the primary field $H_p$, has no voltage induced therein until such time as airplane 10 passes over an ore body, or group of ore bodies, at which time the coil 12 will have a voltage induced therein due to the presence of the vertical components of the secondary field $H_s$ which emanates from the ore bodies. The small horizontal components of the secondary fields $H_s$ picked up by the reference coil 14 can be ignored herein for reasons which will be made apparent in the description which immediately follows:

The induced secondary fields $H_s$ may be in-phase or out-of-phase with the horizontal primary field $H_p$. Buried ore bodies that are good conductors produce secondary field $H_s$ which are in-phase, or almost in-phase, with the primary field $H_p$. Poor conductors produce fields which are more or less out-of-phase (quadrature) with the primary field, dependent upon the specific conductivity of the ore body. Accordingly, voltages induced in receiving, or pickup, coil 14 due to the presence of the vertical components of secondary fields, have components which are in-phase, or real, and components which are out-of-phase, or in quadrature, with respect to the primary field. The voltages induced in reference coil 14 is due mainly to the presence of the primary field $H_p$, and is affected very little by the presence of the secondary field $H_s$ and, accordingly, is used, as is described in detail hereafter, as a reference for the phase components of the secondary fields. When secondary fields are present, their small horizontal components, which induce a small voltage in coil 14, do shift the phase of the voltage induced coil 14 somewhat, but the shift is so small that it is insignificant and it can be ignored, along with the horizontal components of the primary field which produce it.

Figure 2:
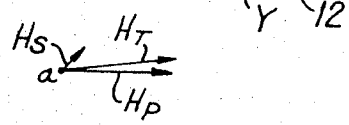
FIG. 2 is a phase diagram representing the relative phase of the primary and secondary fields surrounding the buried ore body in FIG. 1.
Figure 2:
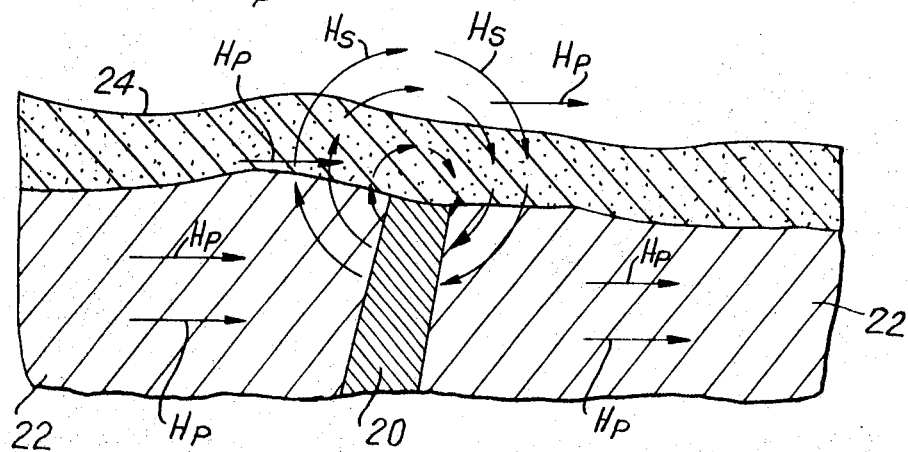
Figure 2:
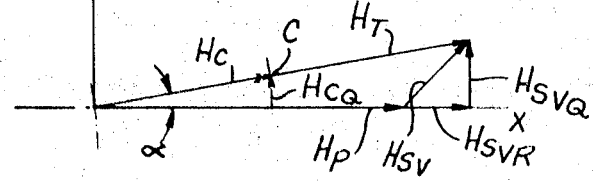

FIG. 2 is a phase diagram which shows the relative phase of the voltages induced in the coils 12 and 14. The phasor $H_p$, which is taken as a reference and aligned in the diagram along the zero-degree coordinate $x$ therein, represents the voltage induced in the reference coil 14. The phasor $H_{sr}$ represents the voltage induced in coil 12 due to the vertical components of the secondary fields. It has a real component $H_{srr}$ which is in-phase with the voltage represented by the phasor $H_p$, and a component $H_{srq}$ which is 90° out-of-phase, or in quadrature, with the voltage represented by phasor $H_p$. The phasor sum of these two voltages, i.e., of the voltages represented by the phasors $H_p$ and $H_s$ is represented by the phasor $H'$, which is out-of-phase with the voltage represented by phasor $H_p$ by an angle $\alpha$. As it can be noted, the angle $\alpha$ is proportional to the quadrature components $H_{srq}$ of the vertical components $H_{sr}$ of the secondary field $H_s$.

Figure 3:
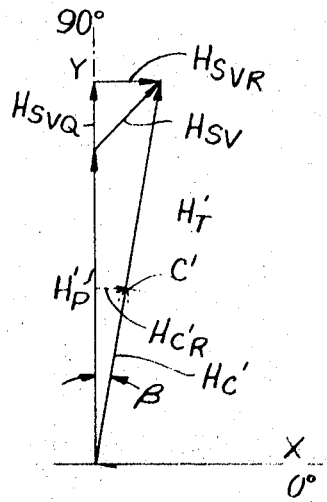
FIG. 3 is a phase diagram similar to that of FIG. 2, wherein the primary field is shown shifted 90° with respect to its phase in FIG. 2.

FIG. 3 is a phase diagram similar to that of FIG. 2, but wherein the voltage induced in the reference coil 14 is shown phase-shifted 90° with respect to its phase in FIG. 2. In this FIG. phasor $H_p'$, aligned in the diagram along the $y$ coordinate, i.e., at the 90° reference therein, represents the phase-shifted voltage, and the phasor $H^{sr}$ drawn from end point of phasor $H_p'$ again represents the voltages induced in the pickup coil 12 due to the vertical components of the secondary fields. The phasor $H_{srq}$ represents the out-of-phase, or quadrature, components of the vertical components of the secondary fields, and the phasor $H_{srr}$ represent the in-phase, or real, components. The phasor total of the voltages $H_p'$ and $H_{sr}$ is represented by the phasor $H_t'$ which is out-of-phase with the phase-shifted voltage represented by the phasor $H_p'$ by an angle $\beta$ which, as can be noted, is proportional to the real, or in-phase, components $H_{srr}$ of the vertical components $H_{sr}$ of the secondary fields $H_s$ which induce a voltage in coil 12.

Figure 4:
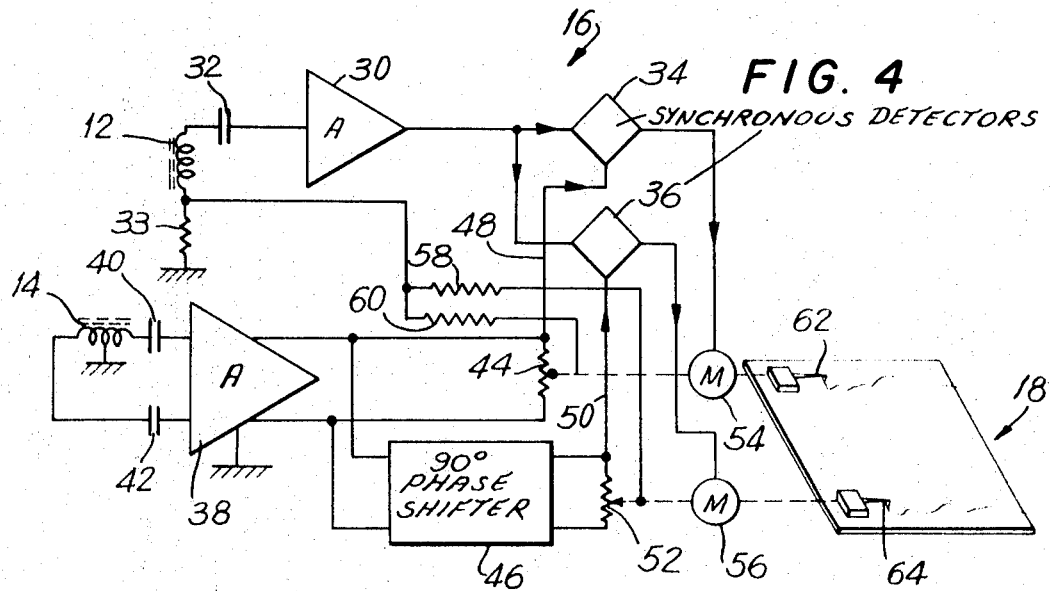
FIG. 4 is a block diagram of one embodiment of the electromagnetic prospecting apparatus of this invention.

FIG. 4 shows an embodiment of the electromagnetic prospecting apparatus of this invention for making measures indicative of the in-phase, or real, and out-of-phase, or quadrature, components of the vertical components $H_{sr}$ of the secondary fields $H_s$ to indicate the presence and the nature of the buried ore bodies from which they emanate. This apparatus is adapted to continuously record measured levels of the real and quadrature components, and the apparatus is particularly adapted for airborn use. The apparatus includes coils 12 and 14, the apparatus 16 and the recorder 18 shown in FIG. 1.

With specific reference to FIG. 3, the receiving, or pickup, coil 12, which constitutes directional alternating magnetic fields sensing means, is coupled through a capacitor 32 to an amplifier designated generally by the number 30. The coil resonates with the capacitor 32 at the frequency of a selected VLF radio station, and is grounded through a resistor 33 of a low resistance, e.g. 10 ohms. The output of the amplifier which is an AC voltage, is fed to two conventional synchronous detectors 34 and 36. The synchronous detectors detect or rectify the AC voltage that is applied to their respective inputs when it is in-phase with a reference voltage which is applied respectively to each detector. The level of he DC output of each synchronous detector is proportional to the level of the AC voltage applied to the respective inputs, and the polarity of the DC outputs is the same as the polarity of the input voltages with respect to the reference voltages. In the case of the synchronous detector 34 the reference voltage is real, and in the case of the synchronous detector 36 the reference voltage is in-phase quadrature with the primary field.

The respective reference voltages are derived by the reference coil 14, which has a grounded center tap and which feeds the input of a balanced amplifier 38 through capacitors 40 and 42. The output of amplifier 38 is connected across the fixed contacts of a potentiometer 44 and is also fed to a 90° phase shifter 46 whose output is connected across the fixed contacts of a potentiometer 52. A real reference voltage is applied to the synchronous detector 34 from the amplifier 38 and a quadrature reference voltage from the phase shifter 46 is applied to the synchronous detector 36.

The outputs of the synchronous detectors 34 and receiving, are respectively fed to DC motors 54 and 56 which can turn in two directions, depending on the polarity of the voltage applied to them. The motor 54 has a shaft (not shown) that is mechanically coupled by suitable linkage to the rotor or movable contact of the potentiometer 44. Similarly, the shaft, (not shown) of the motor 56 is mechanically coupled with the rotor of the potentiometer 52. In addition, the rotors of the potentiometers 44 and 52 are respectively electrically connected through the resistors 58 and 60 to the junction of the receiving coil 12 and the resistor 33. The respective shafts of the motors 54 and 56 are also connected by means of suitable linkages to pens 62 and 64 of a conventional recorder 18 of the moving paper kind or the like.

In operation, a voltage is induced in a receiving, or pickup, coil 12 when vertical secondary fields are present due to the presence of an ore body, and this voltage may include real and quadrature components. The voltage induced in the receiving coil 12 is amplified by the amplifier 30 and is detected by the phase-discriminating synchronous detectors 34 and 36. The DC output of the detector 34 is proportional to the level of the AC voltage from the amplifier 38. The output of the synchronous detector 34 energizes the motor 54 causing the shaft of the motor to turn the rotor of the potentiometer 44. A compensating real voltage from the amplifier 38 is applied to the fixed contacts of the potentiometer 44, and a portion of the compensating voltage is fed back to the receiving coil 12 from the rotor of the potentiometer 44. As the rotor rotates, the compensating voltage applied to the receiving coil 12 increases or decreases depending on the sense of rotation, thereby balancing the real voltage induced in the receiving coil 12. As a balance condition is approached, the output of synchronous detector 34 diminishes. This causes the motor 54 to slow down and eventually to stop when the output of the synchronous detector 34 has reached zero. The shaft of the motor 54 is also mechanically coupled to the pen 62 of the recorder 18, and the position of the pen 62 depends on the relative orientation of the shaft of the motor 54. When no real voltage is induced in the receiving coil 12, i.e., when there is no in-phase component of the vertical component of the secondary field inducing a voltage in the receiving coil 12, the pen 62 draws a straight line on the moving paper of the recorder 18. When real voltage appears at the input of the amplifier 30, however, the balance is upset and the shaft of the motor 54 rotates until balance again is achieved. The rotation of the motor shaft displaces the pen 62 and a corresponding indication is marked on the moving paper of the recorder 18. This servosystem is of the type well known in the art.

The operation of the portion of the circuit which is responsive to quadrature voltages is identical to that described above, and the result is that two traces are made on the recorder 18, one representing the value of a real component and the other representing the value of the quadrature component of the vertical component of the secondary field.

Figure 5:
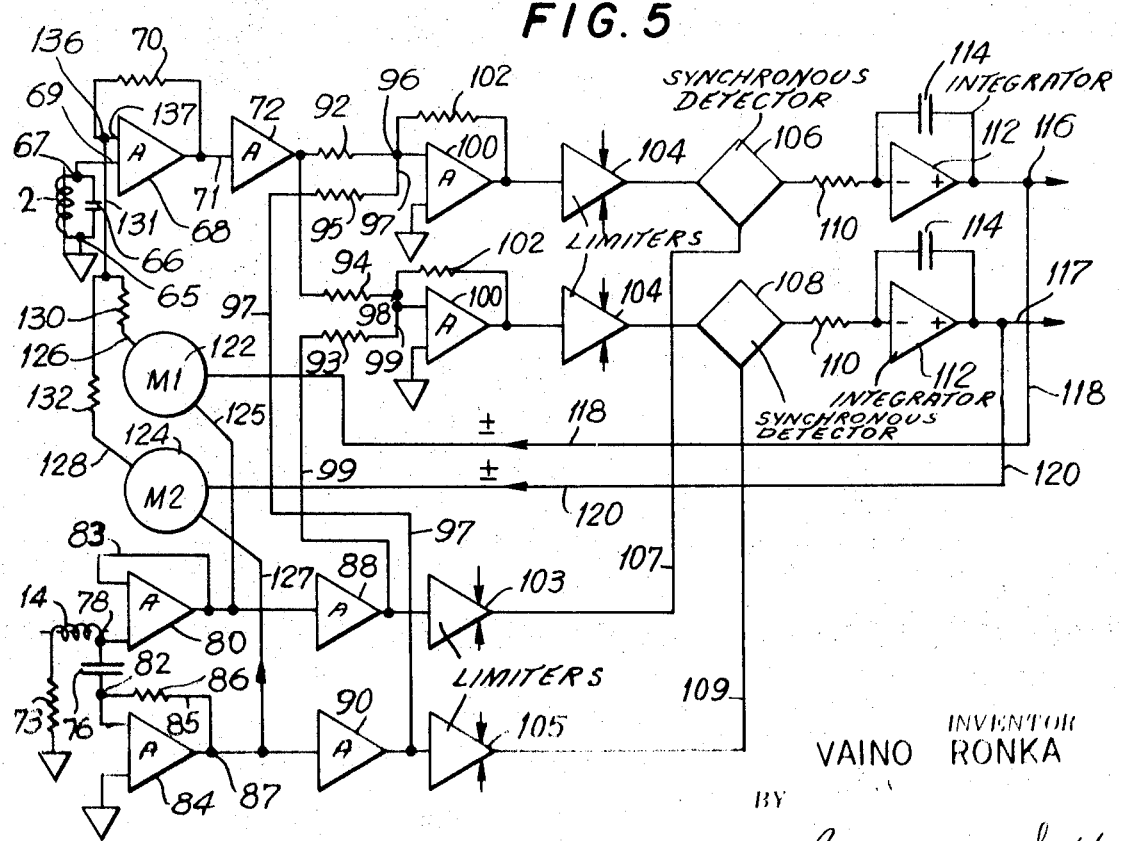
FIG. 5 is a block diagram of another embodiment of this invention.

FIG. 5 shows another embodiment of electromagnetic prospecting apparatus in accordance with the invention for making and recording measures indicative of the real and quadrature component of the vertical components of the secondary fields which emanate from buried ore bodies when they are intersected by a primary field. This apparatus also advantageously is adapted for airborne use and is less sensitive to noise than the embodiment previously described. Also, its servo loop operates independently of the signal strength of the secondary field and is not frequency sensitive within its practical bandwidth. Furthermore, the output of this apparatus can be used as a signal input to any recorder, or meter, whether the recorder be in the air with the equipment, or on the ground.

In this embodiment, the receiving, or pickup, coil 12, which constitutes directional alternating magnetic field sensing means, is coupled in parallel with a capacitor 66, which coil-capacitor combination is tuned to resonate at the frequency of a selected VLF radio station. The capacitor 66 can be of the variable capacitance type, or can be replaced with another capacitor, to provide for selective tuning. Junction 65 between coil 12 and capacitor 66 is grounded, and the voltage induced in coil 12 is fed through line 69 from the other junction 67 between the coil 12 and capacitor 66 to operational amplifier 68 having feedback resistor 70. The output from amplifier 68, then is fed by line 71 to filter amplifier 72, whose output voltage is branched through the resistors 92 and 94 to two junctions 96 and 98 where it is mixed at each with a reference voltage. At junction 96 the voltage is mixed with an out-of-phase reference voltage which enters by line 97 having resistor 95 therein; and at junction 98 the voltage is mixed with an in-phase, or real reference voltage which enters by line 99 having resistor 93 therein. Each mixed signal is maintained in a separate channel and fed through a respective summing amplifier 100 having a feedback resistor 102, then through a limiting amplifier, or clipper, 104 and then to a phase-discriminating synchronous detector. The voltage mixed at junction 96, which includes the in-phase reference voltage, passes to phase-discriminating synchronous detector 106 for rectifying, or detecting, the voltage component which is in-phase with one reference voltage, and the voltage mixed at junction 98, which contains the real reference voltage, is fed to a phase-discriminating synchronous detector 106 for rectifying, or detecting, the voltage component which is in-phase with another reference voltage. The synchronous detector 106 has an in-phase reference voltage applied thereto and detects the in-phase components of the vertical components of the secondary fields, and the synchronous detector 108 has an out-of-phase reference voltage applied thereto and detects out-of-phase components of the vertical components of the secondary fields. The rectified DC outputs from each synchronous detector 106 and 108 are fed through a resistor 110 to respective integrating amplifiers 112, having capacitors 114, which amplifiers smooth the DC voltage and have longtime constant and provide an output that slopes i.e. continues either to rise or fall, until the polarity of the respective DC voltage input changes, at which time the rise or fall is reversed. The output from each amplifier 112 then is fed by the respective lines 116 and 117 to any suitable recording or metering instrument having two channels, one for recording the output from synchronous detector 106 which indicates the real components of the vertical magnetic fields and the other for recording the output from synchronous detector 108 which indicates the quadrature component of the vertical components if the secondary magnetic fields.

The real and quadrature reference voltages are obtained directly from the reference coil arrangement as follows. Reference coil 14 whose Q value advantageously is similar to the Q value of the coil 12, has an internal loss resistance 73 and is grounded at one end thereof and connected at its other end with a tuning capacitor 76 to resonate at the frequency of the selected VLF radio station. Like capacitor 66, capacitor 76 can be of the variable type or can be changed to select a station of a specific frequency. The voltage induced in coil 14 is fed from junction 18 between coil 14 and capacitor 76 to operational amplifier 80 whose feedback line 83 has negligible resistance so that there is an amplification of one between the input and output of the amplifier. The voltage at junction 82 on the other side of capacitor 76 is fed to operational amplifier 84 which thus has a gain about equal to the value of resistor 86 is divided by the value for loss resistor 73, which amplification is required to bring the level of output from amplifier 84 near to the level of the output from amplifier 80. This is required because of the voltage input into amplifier 84 is Q-times smaller than the voltage input into amplifier 80. The voltages taken at junction 78 and 82 are taken directly from the reference coil circuit arrangement; accordingly, the phase difference between them remains 90° independent of frequency within the bandwidth of the tuned circuit.

At resonance the voltage across capacitor 76 lags the voltage induced in reference coil 14 by 90°. The current through coil 14 and capacitor 76 is in-phase with the voltage induced in coil 14, and, accordingly, is 90° out-of-phase with the voltage across the capacitor 76. This current through coil 14 and capacitor 76 then flows through the feedback resistor 86 for operational amplifier 84. The current flows through the feedback resistor 86 because operational amplifier 84 has a high-input impedance and an infinity high gain for signals introduced at junction 85 through line 83 and, hence, the current must flow through its feedback resistor 86.

At resonance, the output voltage from the amplifier 84 is equal to the value for resistor 86 divided by the value for loss resistor 73 multiplied by the sum of voltages induced in coil 14. That is, as indicated, the gain for the circuit of amplifier 84 is given by the value for resistor 86 divided by the value for loss resistor 73. Accordingly, to bring the level of the output from amplifier 84 near or equal to the level of the output from amplifier 80, the feedback resistor 86 must be equal in value to $\omega L$ or $1/\omega C$, where L is the inductance of coil 14 and C is the capacitance of capacitor 76 and W is equal to $2\omega f$.

At frequencies other than resonance, the current is limited by the inductive and capacitive reactance of coil 14 and capacitor 76. The total series reactance being the vector sum $R_L + j(\omega L - 1/\omega C)$, where $R_L$ is the resistance of loss of resistor 73 and L and C, are as given above. Accordingly, the phase of the current in the circuit is dependent on frequency because of this reactance, but nonetheless, it should be noted, there is also a 90° difference in phase between the current and the voltage across the capacitor, This 90° difference is maintained independent of frequency.

The voltage output from the amplifier 84, accordingly, also always is 90° out-of-phase with respect to the voltage across the capacitor 16, because the phase of the amplifier output voltage is dependent on the phase of the current passing therethrough. The amplitude of the voltage at junction 82 drops at frequencies other than resonance, but the amplitude of the voltage from the vertical receiving coil at junction 78 also drops proportionally. Accordingly, it is seen that the relative phase and amplitudes of the signals are not influenced by frequency change. Thus, this receiving coil system can be used advantageously in situation where atmospheric noise is to be used as a source or primary fields. Furthermore, it provides for a relative 90° phase shift independent of frequency over the entire bandwidth of operation.

It should be recognized, of course, that this phase-shifting circuitry could be used with other signal sources which do not necessary involve receiving coils. For example, it should be recognized that this type phase shifting circuitry could be placed in the reference or other channel of the present device, or likewise be used in other equipment to obtain a 90° relative phase shift independent of frequency.

The signal from amplifier 80 is fed to an active-filter amplifier 88 and the output from the amplifier 84 is fed to a second active-filter amplifier 90. When the voltage induced in coils 12 and 14 are in-phase, the phase of the voltages at junctions 67 and 78, i.e., the phase of the voltages into amplifiers 68 and 80, are the same with respect to each other. Accordingly, the voltage taken at junction 78 provides an in-phase reference voltage for the voltage induced in coil 12. At junction 82, on the other side of the capacitor 76, however, the voltage is 90° out-of-phase with respect to the voltage at junction 78. Likewise, it is 90° out-of-phase with respect to the voltage at junction 67. Hence, this voltage taken at junction 82 provides a phase-quadrature reference voltage. The output from amplifier 88 provides, therefore, the real, or in phase reference voltage, which passes through line 99 having resistor 93 therein, to junction 98 where it is mixed with the voltage from amplifier 72, and the output from amplifier 90 provides the phase-quadrature, or imaginary, 90° out-of-phase reference voltage which passes through line 97, having resistor 95 therein to junction 96 wherein it is mixed with the voltage from amplifier 72.

In addition, the respective outputs from the amplifiers 88 and 90 are channeled through limiting or clipping, amplifiers 103 and 105 respectively and are used as reference voltages for the phase-discriminating synchronous detectors. The output from amplifier 88, after passing through the clipping amplifier 103, passes through line 109 and provides an in-phase reference voltage for the phase-discriminating synchronous detector 106, and the output from amplifier 90, after passing through the clipping amplifier 105, passes through line 109 and provides an phase-quadrature, or imaginary, reference voltage for phase-discriminating synchronous detector 108.

The phase diagrams of FIGS. 2 and 3 diagrammatically illustrate the operations that this apparatus performs, WIth specific reference to FIG. 2 the phasor $H_{sr}$ represents, or is proportional to the output voltage from the amplifier 72, and $H_p$ represents, or is proportional to, the real, or in-phase, reference voltage from the amplifier 88 which is mixed at junction 98 with the voltage output from amplifier 72. The phasor sum of these mixed voltages is represented by the phasor $H_T$. The mixed voltages, after leaving amplifier 100 and after being limited, or clipped, to the point C by the respective clipping amplifier 104, are represented by the phasor $H_c$ which ends at point C. The phase-discriminating synchronous detector 108, having a phase-quadrature reference voltage fed thereto by line 109, detects the quadrature component $H_{cQ}$ of the clipped total field $H_c$. This detected quantity $H_{cQ}$ is proportional to the quadrature components $H_{srQ}$ of the vertical components $H_{sr}$ of the secondary fields $H_S$ and is also proportional to the angle $\alpha$ between the primary field $H_p$ and the total field $H_T$. This value $H_{cQ}$ is thus measured independently of the magnitude of the fields $H_p$ and $H_s$. It is recorded by a suitable recorder and, as indicated, its value is indicative of the quadrature component $H_{srQ}$ of the horizontal component $H_{sr}$ of the secondary field $H_s$.

With reference to FIG. 3, the phasor $H_{sr}$ likewise represents, or is proportional to, the output from the amplifier 72, but in this FIG. $H_p'$ represents, or is proportional to the 90° phase-shifted voltage from amplifier 90, which is mixed at junction 96 with the voltage output from amplifier 72. The phasor sum of these mixed voltages is represented by the phasor $H_T'$. The mixed voltages, after leaving amplifier 100 and after being limited, or clipped, to the point C by Trespective clipping, amplifier 104, are represented by the phasor $H'_c$ which ends at point C'. The phase-discriminating synchronous detector 106, having a real, or in-phase reference voltage fed thereto by line 107, detects the real component $H_c$ R of the clipped total field $H'_c$. This detected quantity $H_{c\ R}$ is proportional to the real components $H_{srR}$ of the vertical components $H_{sr}$ of the secondary fields $H_s$ and is also proportional to the angle $\beta$ between the phasor $H_p'$ and $H_T'$. This value $H'_{c\ R}$ is measured independently of the magnitude of the fields $H_p$ and $H_s$. It can be recorded by a suitable recorder and, is indicative of the real components $H_{srR}$ of the horizontal components $H_{sr}$ of the secondary fields $H_s$. It thus can be seen that measures indicative of the real and quadrature components of the vertical components of the secondary magnetic fields $H_s$ is accomplished by the apparatus of FIG. 5.

The voltages detected by the synchronous detectors 106 and 108 must be nulled to enable continuous recording of the discontinuous signals. This is done by balancing the voltage from coil 12 fed to the amplifier 68 through line 69 by applying a compensating voltage to its other input feed line 137. When a voltage identical to the voltage impressed upon line 69 is impressed upon the line 137, the output from the amplifier 68 will be zero. Compensating voltages which tend to equalize the voltage impressed upon the lines are derived from the coil 14 and capacitor 76 are supplied, as required, from one or both, of modulators 122 and 124. Modulators 122, connected to the output of amplifier 80 by line 125, supplies, through line 126, having resistor 130 therein, and line 131, an in-phase compensating or balancing voltage to line 137 at junction 136 when a DC voltage appears at line 116 from the output of synchronous detector 106. Modulator 124, connected to the output of amplifier 84 by line 127, supplies, through line 128, having resistor 132 therein, and line 131, an out-of-phase compensating or balancing voltage to line 137 at junction 136 when a DC voltage appears at line 117 from the output of synchronous detector 108. The modulators 122 and 124, connected through the respective amplifiers 112 and lines 116 and 118 to the respective outputs of the phase-discriminating synchronous detectors 106 and 108, are responsive to the DC outputs therefrom. Accordingly, when a voltage appears at the output of synchronous detector 106, and passes through its respective integrating amplifier 112, line 116 and line 118, it actuates modulator 122 causing it to send a compensating in-phase voltage to input line 137. Likewise, when a voltage appears at the output of synchronous detector 108, and passes through its respective integrating amplifier 112, 117 and line 120, it actuates modulator 124 causing it to send a compensating out-of-phase voltage to input line 137.

In operation, DC voltages appear at the outputs of the synchronous detectors 106 and 108 due the presence of the vertical components of secondary fields which have in-phase and quadrature components and which induce voltages in coil 12. The voltages at the outputs of the synchronous detectors are fed to the integrating amplifiers 112 having capacitors 114, which smooths and integrates them. The output voltages from the integrating amplifiers increase of decrease, dependent upon the polarity of the input signal, continuously until such time a signal disappears, at which time the increase or decrease of the output signal is stopped. Assuming that the detected secondary field remains constant for a given period, the outputs 116 and 117 from the respective amplifiers 112 will continue to increase or decrease and, accordingly, the modulators 122 and 124 increase or decrease the compensating voltages to line 137 until the signals on lines 69 and 137 are equal, thus zeroing the signals from amplifiers 100, or until the polarity of the outputs signals from the synchronous detectors are zeroed because the reference voltages compensate, i.e., become to the balancing point, and, accordingly, causes the polarity of the output from the respective synchronous detector to null. When the signals on line 137 and 69 equalize, no voltage comes from amplifier 68 and accordingly, the outputs from the synchronous detectors 106 and 108 disappear. When this happens the output of the integrating amplifiers 112 remain steady and modulators 122 and 124 send constant compensating signals to the line 137. When the secondary fields change, the equipment operates in the same way to achieve a balanced condition at the level of the new induced voltage. The system constantly attempts to achieve a balance. The respective outputs from amplifiers 122 are indicative of the respective values of the compensating real and/or quadrature voltages required to hull the detected voltages and, hence, are indicative also of the real and quadrature components of the vertical components of the secondary fields. The outputs from amplifiers 122 can be recorded by any suitable recorder, and, when such is continuously recorded, the change in both the real and the quadrature components of the vertical components of the secondary fields with respect to the overburden traversed, i.e., with respect to the path of the aircraft, is recorded.

It is equally clear that if that the foreign disclosure relates signals completely disappears from all coils, the input DC other from the integrating amplifiers 112 disappear. The outputs of the amplifiers 112 remain constant, and thus the positions of magnetic recording pens, or the like, remain constant. Accordingly, although the interruption of the signal leaves time Numerous on the recorded record, the recorder is not upset.

It should be understood, of course, that the foregoing disclosure relates to only preferred embodiments of the invention. Horizontal or other components, as well as vertical components, can be detected and measured within the teachings of this invention. Also, other magnetic field components, for example, gradients, could be measured by suitable changing the orientation of the coils. Numerous modifications or alterations may be made herein without departing from the scope of the invention, as set forth in the following claims.

What is claimed is:

1. An electromagnetic prospecting apparatus for making measurements indicative or real and quadrature components of secondary alternating fields that emanate from buried ore bodies when they are intersected by a primary alternating field comprising, in combination, means for developing a voltage proportional to components of said secondary alternating fields, means for deriving real reference voltage and a quadrature reference voltage, means for simply summing said proportional voltage with said reference voltage, means for simply summing said proportional voltage with said quadrature reference voltage, said summed voltages being maintained independent in separate channels and constituting respective first and second summed voltages, and means for amplitude limiting each of said summed voltages and for detecting the quadrature component of said first summed voltage and the real component of said second summed voltage, thereby to provide indicia of the real and quadrature components of said secondary fields.

2. An electromagnetic prospecting apparatus for making measurements indicative of real and quadrature components of secondary alternating magnetic fields that emanate from buried ore bodies when they are intersected by a primary alternating magnetic field, said apparatus comprising, in combination, directional alternating field sensing means having an axis, an amplifier which is responsive to voltages that are induced in said field sensing means due to the presence of said real and quadrature components of sad secondary fields, means for deriving a real reference voltage and for deriving a quadrature reference voltage, means for mixing said voltages from said amplifier with said real reference voltage, means for mixing said voltages from said amplifier with said quadrature reference voltages, said mixed voltage being maintained independently and constituting first and second mixed voltages, means for amplitude limiting each of said mixed voltages, first and second phase-discriminating synchronous detectors for respectively detecting the quadrature component of said first mixed voltage and for detecting the real component of said second mixed voltage, means for deriving a compensating real voltage and for deriving a compensating quadrature voltage for automatically nulling said voltages detected by said synchronous detectors and for continuously indicating values of said respective compensating voltages to thereby provide a continuous indication of said real quadrature components of said secondary fields.

3. Electromagnetic prospecting apparatus as described in claim 2 wherein the means for deriving a compensating real voltage and for deriving a compensating quadrature voltage includes first and second modulators for supplying said compensating voltages, said modulators being operatively connected with said detectors for changing said compensating voltages in response to changes in said detected voltages.

4. Apparatus as described in claim 2 wherein said means for driving a real reference voltage and said means for deriving a oriented perpendicular reference voltage includes a reference coil having an axis oriented perpendicular to the axis of said receiving coil and a capacitor connected in series with said coil, said real reference voltage being taken at a junction between said coil and one side of said capacitor and said quadrature reference voltage being taken at a junction at the other side of said capacitor, whereby each reference voltage is obtained directly from said series connected coil and capacitor.

5. Apparatus as described in claim 3 wherein said compensating voltages supplied by said modulation are developed by a reference coil having an axis oriented perpendicular to the axis of said receiving coil and a capacitor connected to series with said coil.

6. Apparatus as described in claim 5 wherein said reference coil and capacitor are connected with both said synchronous detector and said modulators for supplying both said reference voltages and said compensating voltages.

7. An apparatus according to claim 5 wherein said means for deriving the real and the quadrature reference voltages includes a coil and capacitor connected in series, said real reference voltage being taken at a junction between said coil and one said side of said capacitor and said quadrature reference voltage being taken at a junction at the other side of said capacitor.

8. An apparatus as described in claim 7 first and second amplifiers respectively connected at said junctions, each of said amplifiers being responsive to a respective one of said reference voltages.

9. An apparatus as described in claim 8, wherein said amplifiers are operational amplifiers adapted to provide respective output voltages which are generally equal in magnitude.

10. An apparatus as in described in claim 9, wherein one of said amplifiers has a feedback resistor, the resistivity of which is selected to ensure that said respective output voltages are generally equal in magnitude.

11. The method of electromagnetic prospecting comprising the steps of obtaining a voltage proportional to a component of the secondary alternating fields resulting when a buried ore body is intersected by a primary field, obtaining a real reference voltage and a quadrature reference voltage, mixing said proportional voltage in a first channel with said real reference voltage, simply summing said proportional voltage in a second channel with said quadrature reference voltage, amplitude limiting each of said summed voltages and detecting the quadrature component of said first summed voltage and independently detecting the real component of said second summed voltage, thereby to provide an indication of the relative real and quadrature components of said component of said secondary alternating magnetic fields.

12. The method of electromagnetic prospecting in claim 11 wherein the step of obtaining said real and said quadrature reference voltages includes placing a reference coil adapted to have a voltage induced therein in said primary field.

13. The method of electromagnetic prospecting comprising the steps of obtaining a voltage proportional to the real and quadrature components of the secondary alternating fields resulting when a buried ore body is intersected by a primary field, obtaining a real compensating voltage and a quadrature compensating voltage, using said real and said quadrature compensating voltages to null said proportional voltage, obtaining a real reference voltage and a quadrature reference voltage, obtaining a voltage indicative of said change in a first channel with said real reference voltage, mixing said voltage indicative of said change in a second channel with said quadrature reference voltage, said mixed voltages constituting respective first and second mixed voltages, amplitude limiting each said mixed voltages, detecting the quadrature component of said first mixed voltage and the real component of said second mixture voltage, integrating said detected voltages recording in a separate channel each of said integrated voltages and regulating said compensating voltages by said integrated voltages respectively thereby to provide a continuous record of the real and quadrature components of said secondary alternating fields.

14. The method of electromagnetic prospecting as described in claim 13 wherein the step of obtaining said real and said quadrature reference voltages includes placing a reference coil adapted to have a voltage induced therein in said primary field.

UNITED STATES PATENT OFFICE
CERTIFICATE OF CORRECTION

Patent No. 3,614,600         Dated October 19, 1971

Inventor(s) Vaino Ronka

It is certified that error appears in the above-identified patent and that said Letters Patent are hereby corrected as shown below:

Claim 2, line 9   "sad" should be -- said --

Claim 5, line 2   "modulation" should be -- modulators --

Claim 7, line 5   omit "said" before -- side -- (first occurrence)

Signed and sealed this 9th day of May 1972.

(SEAL)
Attest:

EDWARD M. FLETCHER, JR.            ROBERT GOTTSCHALK
Attesting Officer                  Commissioner of Patents